United States Patent
Cohee et al.

(10) Patent No.: US 6,647,668 B1
(45) Date of Patent: Nov. 18, 2003

(54) SPACE ERECTED INFLATABLE STRUCTURE

(75) Inventors: Donald R. Cohee, Felton, DE (US); Robert L. Pauly, Friendswood, TX (US); Craig R. Scheir, Dover, DE (US); David P. Cadogan, Middletown, DE (US)

(73) Assignee: ILC Dover, Inc., Frederica, DE (US)

( * ) Notice: Subject to any disclaimer, the term of this patent is extended or adjusted under 35 U.S.C. 154(b) by 0 days.

(21) Appl. No.: 09/700,980

(22) PCT Filed: Mar. 21, 2000

(86) PCT No.: PCT/US00/07343

§ 371 (c)(1),
(2), (4) Date: Nov. 22, 2000

(87) PCT Pub. No.: WO00/61894

PCT Pub. Date: Oct. 19, 2000

Related U.S. Application Data

(60) Provisional application No. 60/125,615, filed on Mar. 22, 1999.

(51) Int. Cl.[7] .............................................. E04H 15/20
(52) U.S. Cl. ................... 52/1; 52/2.11; 52/63
(58) Field of Search ................ 52/1, 2.11, 3, 63; 343/915, 721, 894, 880, 832, DIG. 2; 342/10; 359/868

(56) References Cited

U.S. PATENT DOCUMENTS

| | | | |
|---|---|---|---|
| 2,977,596 A | 3/1961 | Justice | |
| 3,184,742 A | 5/1965 | Cutler | |
| 3,286,267 A | 11/1966 | Lutchansky | |
| 5,047,788 A | 9/1991 | Gillard | |
| 5,162,811 A | 11/1992 | Lammers et al. | |
| 5,200,758 A | 4/1993 | Gillard | |
| 5,345,238 A | 9/1994 | Eldridge et al. | |
| 5,685,122 A | 11/1997 | Brisbane et al. | |
| 6,032,080 A | 2/2000 | Brisbane et al. | |
| 6,219,009 B1 * | 4/2001 | Shipley et al. | ............... 343/915 |

OTHER PUBLICATIONS

Appendix—New Millennium Technology for Solar Sails—Inflatable Space Frame (ISF) Technology for the Creation of a Solar Sail Propulsion System.

* cited by examiner

Primary Examiner—Carl D. Friedman
Assistant Examiner—Jennifer I. Thissell
(74) Attorney, Agent, or Firm—Stevens, Davis, Miller & Mosher, L.L.P.

(57) ABSTRACT

An inflatable structure, such as a fabric confining a gas, can be regulated as to its shape by the provision of auxiliary tubes, integral or adjacent to the fabric which can be separately pressurized. The separate pressurization will create local tensile forces to change the shape of the structure. Alternatively, a mechanical system, such as tensioned cables can be used to control the shape of the structure.

18 Claims, 4 Drawing Sheets

SPACE ERECTED INFLATABLE STRUCTURE

This application claims the benefit of Provisional application Ser. No. 60/125,615, filed Mar. 22, 1999.

BACKGROUND OF THE INVENTION

1. Field of the Invention

Space-erected inflatable structures, such as reflectors, antennae, sunshields, solar sails and other structures having low weight, low packing volume and simplicity are disclosed which can be inflated in space and rigidized or used as non-rigid structures after inflation. One of the biggest disadvantages of inflatable structures is in the anisotropic nature of the flexible materials in general of which such structures are composed. This results in extreme difficulty in designing and fabricating inflatable structures to very precise shapes. The subject invention overcomes this disadvantage by providing an inflatable structure such as an inflatable space frame which can be provided with a positioning feedback system that allows the inflatable to reshape itself to a precise point and shape.

2. Description of the Related Art

Inflatable (or collapsible) antennas are described in various prior publications, such as U.S. Pat. No. 2,977,596 which recognized that due to the weight of ice forming on the structure, or to wind or other forces, the inflated structure was subject to distortion. By making the inflatable structure stronger to withstand such forces, it tended to deform due to its own weight Another use of inflatable structures is described in U.S. Pat. No. 3,184,742, as passive repeaters in communication systems. A discussion of the problem of periodic changes in shape of the inflatable versus the significant and rather deleterious variations in strength of radio signals received from a remote transmitter by way of reflection from the inflatable is discussed.

U.S. Pat. No. 3,286,267 discloses the use of an inflatable membrane to hold an antenna subreflector in front of a main reflector as a Cassegrainan antenna which, in any antenna elevational angle other than vertical, acts as a cantilevered beam and tends to distort (arc) as a result of the transverse load applied to it by the subreflector.

Other antenna systems are disclosed in U.S. Pat. Nos. 5,047,788; 5,162,811; and 5,200,758 which employ a control system, usually of light-emitting devices mounted at locations on the antenna, to detect or locate the position of the antenna from a desired configuration or reference.

Still further, U.S. Pat. No. 5,345,238 teaches an inflatable satellite signal suppression shield which is subsequently hardened in its inflated condition.

None of the foregoing patents (the disclosures of which are incorporated in their entireties, by reference) teach an inflatable structure which consists of the following subsystems:

1.) Inflatable Structure
2.) Inflation Or Mechanical System To Alter Its Shape
3.) Position Sensing And Feedback Control System to control the shape and positioning of the inflatable during erection and hold it in position after erection is completed.

SUMMARY OF THE INVENTION

The present invention provides an inflatable or extensible structure, the shape of which can be altered with a mechanical and/or a gas inflation system to change the shape of the inflatable/extensible (hereinafter "inflatable") structure. When the inflation system is used to change the shape of the inflatable structure, at least three inflation tubes are inflated in conjunction with a feedback control system for precise movement, alignment and positioning of the shape of the inflatable structure which is then suitable for use as a reflector, antenna, power arrays, sunshield, solar sail or other inflatable structure.

As an alternative, or in conjunction, to the use of three or more inflation tubes, a mechanical system such as tensioned cables or telescoping members, which can be shortened or lengthened to change the shape of the inflatable structure to a precise shape and which can be accurately controlled by a feedback system is provided.

The invention will be further understood from the following description of the preferred embodiments.

DETAILED DESCRIPTION OF THE INVENTION

The construction/erection of inflatable structures within or outside of the Earth's atmosphere, i.e., in space, creates unusual problems due to the difficulty of providing a structure of precise shape resistant to forces due to its own weight and the environment, e.g., wind, while in space the launching, and transporting, of the elements of the structure from the Earth to the desired location, as well as the difficulty of assembling or erecting of the elements into the finished structure present formidable problems.

As described earlier, inflatable structures are envisioned for use as reflectors, antennae, power arrays, sunshields and other structures to be erected within the Earth's atmosphere and in space. Deployable or inflatable structures have many desirable advantages, such as low weight, low packing volume and simplicity of erection into the desired configuration.

One of the biggest disadvantages is the anisotropic nature of the flexible material used to form the inflatable itself. This results in extreme difficulty in designing and fabricating inflatable structures to the very precise shapes as are especially required in space.

Even earth-bound inflatables are subject to distortions which affect their desired utility, e.g., deleterious reduction in transmission of reflected waves when their shape departs from the as-designed shape. The subject invention overcomes this disadvantage by incorporating a positioning feedback system that allows the inflatable to inflate to a precise point in space. This "smart" system is intended to be used on inflated and rigidized, as well as non-rigid space structures.

The Inflatable Structure

Figure 1:
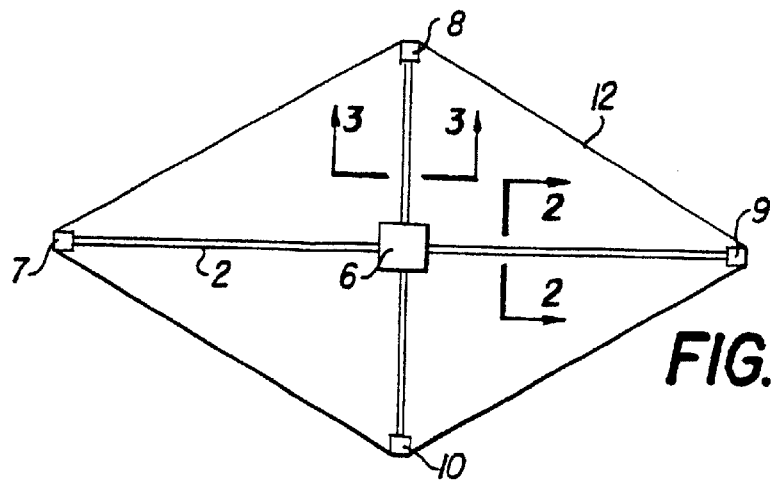
FIG. 1 is a schematic view of one embodiment of an inflatable solar shield according to the invention.
Figure 2:
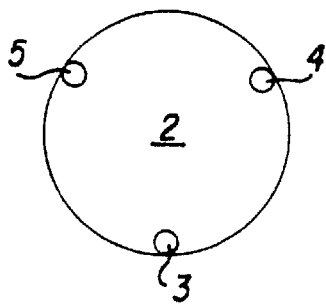
FIG. 2 is a schematic, top view of FIG. 1 sectioned to show details of the inflation system.

The inflatable structure in its simplest form, shown in FIG. 1, could be formed of a gas confining fabric defining an inflatable space 2 so as to deploy a structure. Although a gas under pressure can be used to fill space 2, and the as-designed fabric will assist in initially shaping the inflatable structure and with it the membrane 12, the as-designed shape is subject to distortion, etc., due to various factors, some of which were discussed above. Membrane 12 can be formed of any suitable material. We have found that when membrane 12 acts as a sunshield, a 12 micron thick, VDA (Vapor Deposited Aluminum) coated polyimide is suitable. Three to twelve micron thicknesses of the film are suitable, especially if the film is provided with an integrated ripstop grid. In order to control and/or change the shape of the inflatable, a series of self-contained tubes 3, 4, 5, etc., which are attached to fabric and are each individually inflatable to independent pressures to change the shape of the inflatable structure to counteract unequal reaction forces and shape the membrane 12. A cross-section of the inflatable of FIG. 1, which is shown in FIG. 2, shows the position of the inflation tubes, 3, 4, 5, etc. on the inside of the inflatable space 2.

It is to be understood, however, that this positioning is merely for illustrative purposes, as the tubes may be more than three in number, may be arranged outside, staggered outside and inside, be part of the fabric wall, may be adjacent another similar tube and in some circumstances, even bridge open spaces to form a truss structure. The significant point is that tubes 3, 4, 5 are separately inflatable, the inflation (or deflation) of which will change the shape of the inflated structure and with such change, the shape of the membrane 12. These tubes 3, 4 and 5 can be inflated to different pressures to affect this change of shape. For example, if the pressure in tube 3 is greater than the pressures in tubes 4 and 5, then higher total tensile loads would be applied to the structure skin in the vicinity of tube 3, resulting in higher local material elongation. This would cause the main inflatable space 2 to bend away from the tube 3 side and toward tubes 4 and 5. By varying the pressures in tubes 3, 4 and 5 main inflatable space 2 can be "bent" in any direction desired. In addition, the total extension length of space 2 can be controlled by the pressures within space 2, as well as the pressures in the tubes 3, 4, 5, etc. The lower the pressures, the lower the material elongation, and the lower the extension of space 2.

In the embodiment where the inflatable structure is to be used in space, the entire inflatable structure including the fabric defining space 2, the tubes 3, 4 and 5 the inflation gas and related controls, conduits, etc. can be housed in satellite 6. Inflation gas can be cold $N_2$ gas, or gas from an existing source on the spacecraft. Although it is preferred to be able to continuously monitor and control the shape of the inflatable once the desired shape is achieved, the inflatable can be rigidized, such as by cooling a thermoplastic; or alternatively incorporating a B-stage resin into fabric, UV curable component or micro encapsulated or chemically hardenable system, such as reactive curing gas which hardens the inflatable upon exposure or light or chemical initiation after the structure is inflated to a precise shape.

Preheating of the packed structure is desirable to warm the composite and give it some flexibility. Preheating could be achieved from heat given off of a spacecraft or by small heaters embedded in the packed volume.

The Positioning Feedback System

Satellite 6 also contains a position sensing and feedback control system including four major components, a scanning laser, a reflector 7 to return the light signal, a photoreceptor and a microprocessor based data processor (computer). The laser, housed in satellite 6, can be a single laser that is physically moved (scanned) through a field of view. Alternatively, the laser can utilize a stationary laser diode array which would "scan" the same field of view by the rapid on-off control of individually, precisely angled, laser diodes within the array. Although only a single reflector 7 is described per tube, it is to be understood that the number of such reflectors can be multiplied (as at 8) especially as the shapes to be controlled become more intricate. The simple diamond shaped structure of FIG. 1 is also merely illustrative, and the inflatable can take a wide variety of shapes dependent only on the intended use.

Another positioning feedback system will now be described in relation to FIGS. 9–12.

Figure 9:
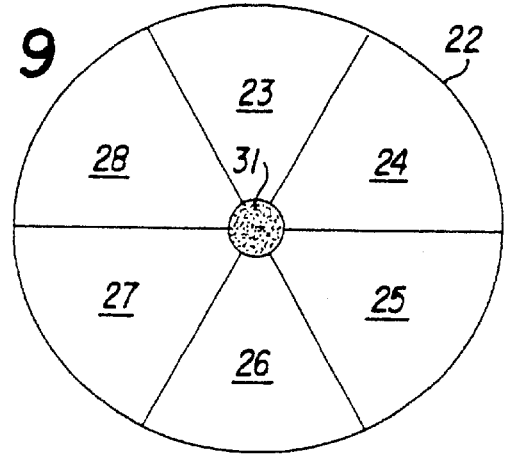
FIG. 9 is a schematic top view of a photosensitive array with six panels surrounding a central "target"
Figure 10:
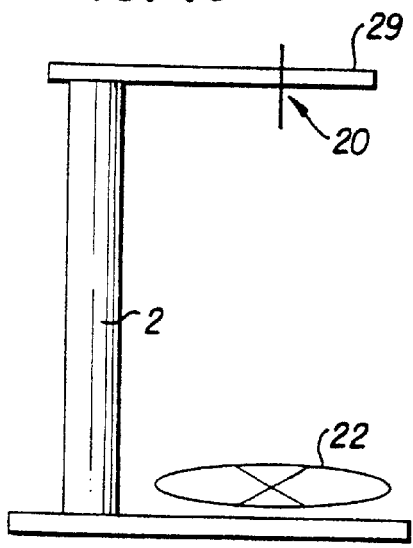
FIG. 10 is a schematic side view of FIG. 9 including a deployed tube and laser boom.
Figure 11:
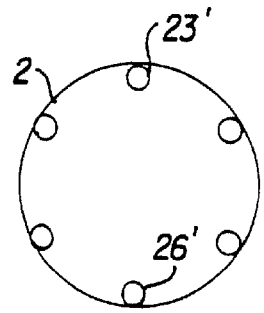
FIG. 11 is a schematic, cross section view through a plurality of inflatable adjustment tubes associated with the deployed tube of FIG. 10.
Figure 4:
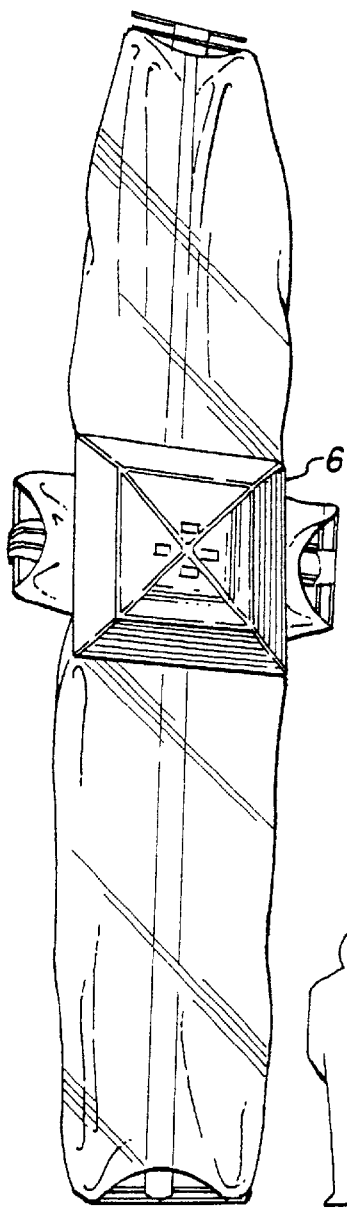
FIG. 4 is a schematic, showing a partially extended structure in one direction of a mock-up to ½ scale.
Figure 5:
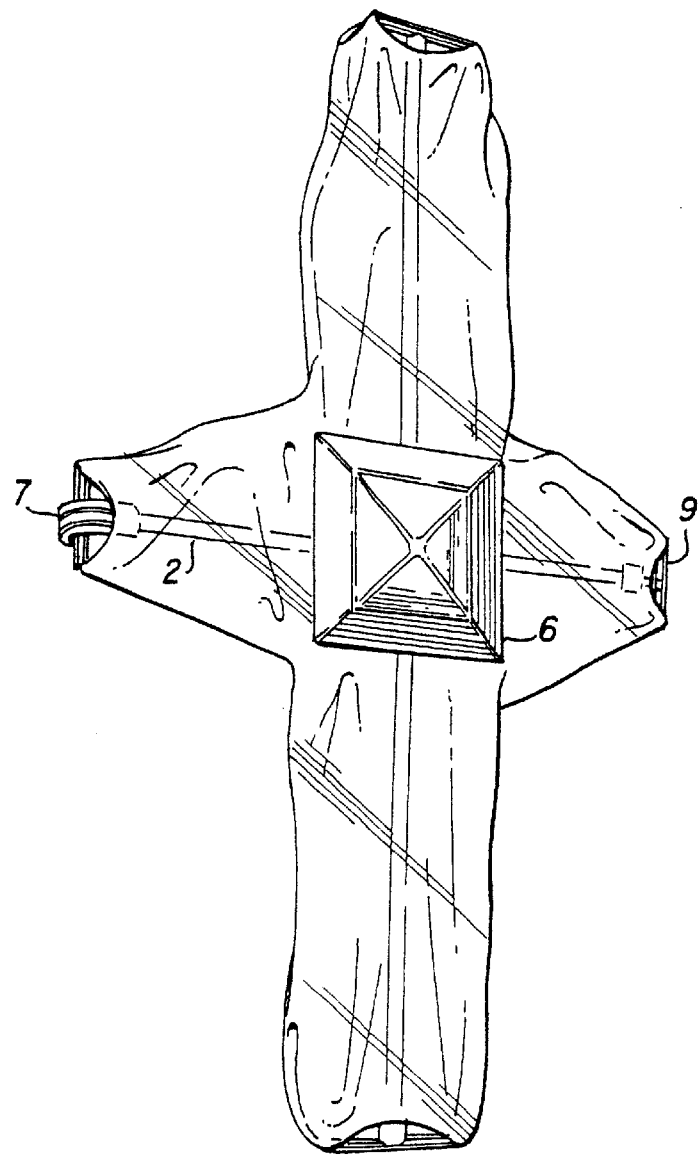
FIG. 5 is a schematic, illustrating the partial inflation in a second direction of the device of FIG. 4.
Figure 6:
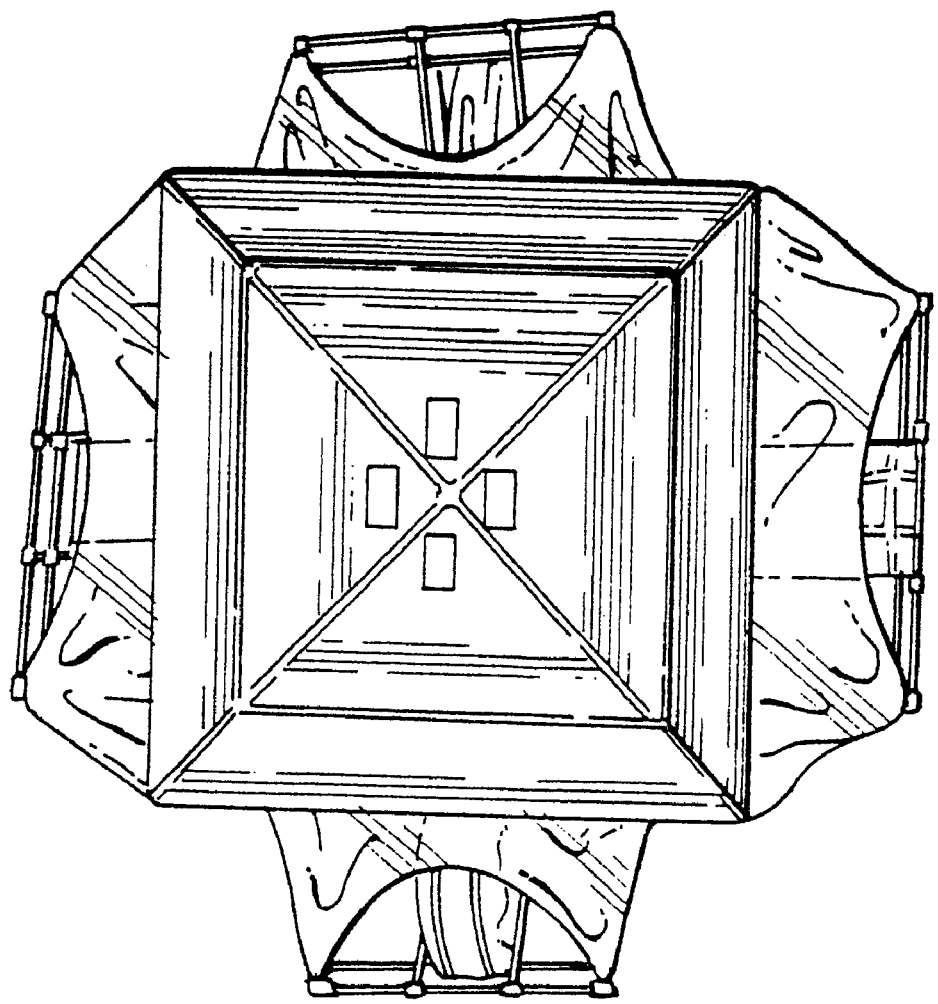
FIG. 6 is a schematic, of the device of FIG. 4 in unextended position.
Figure 7:
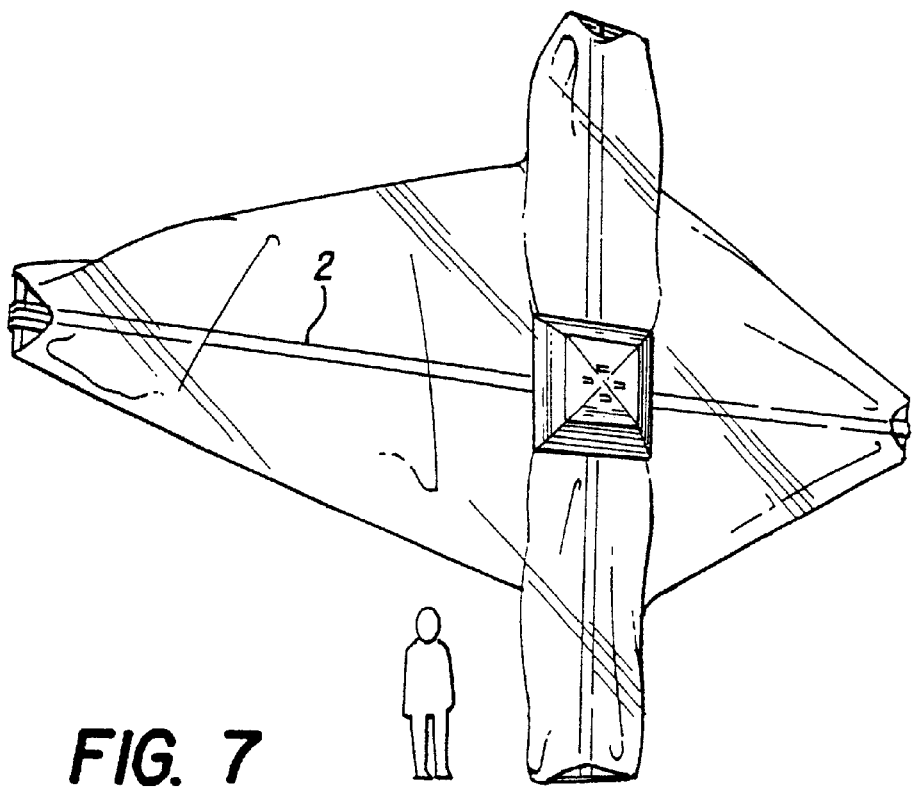
FIG. 7 is a a schematic, of the device of FIG. 5 in a more extended position than shown in FIG. 5.
Figure 8:
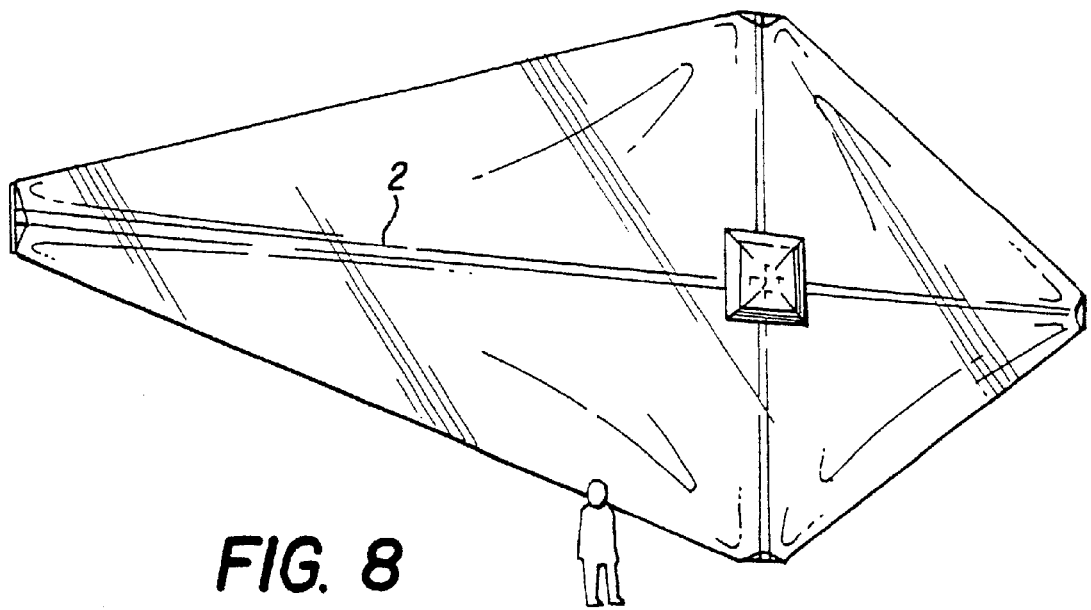
FIG. 8 is a a schematic, of the fully extended device of FIG. 4.

The system shown in FIGS. 9 and 10 will utilize a laser (laser pointer module) or other collimated light source 20 and a circular 22 or domed array containing several wedges 23–28 of photoelectric sensitive material 20. The deployed inflatable tube will have a lateral boom 29 with the laser module 20 attached to it aimed parallel to the axis of the deployed tube towards the photo sensitive array 22. Inside the deployed tube will be a number of adjustment tubes that can have their pressures individually adjusted by an inflation system.

Each wedge of the array 22 is composed of a photosensitive material that generates a measurable voltage level when the laser hits the panel. The sensor will have one voltage level when there is no laser signal, and another when there is a laser signal. With the laser is aimed at the array, if the tube is not straight after deployment, the laser will not hit the center "target" of the array. The laser will actually hit one of the sensor wedges 23–28 causing a detectable voltage change. This change will tell the system that the laser is not centered and thus the tube is not straight. If the laser is showing up on wedge 26 then the electronics will detect this and either inflate/deflate adjustment tube 26' or deflate/inflate the complementary adjustment tube 23'. As this is done, the tube 2 will straighten and the laser will tend to move towards the center "target" 31 of the array 22. If this is not the only adjustment needed (and it is assumed that many adjustments will be needed) the laser will cross a wedge boundary and cause the system to adjust pressure in an adjacent tube. After repeated adjustments, the tube should find its way to the target where no more pressure adjustments are required.

The size of the sensor array will be based upon the length of the tube, the potential curved nature of the tube and the limit in the ability of the adjustment tubes to straighten out the main tube. Each sensor wedge is matched to either a single or a pair of complimentary adjustment tubes to correct alignment of the inflated tube. The array 22 may also have to be constructed as a dome shape in order to account for the angle of the laser as the inflatable tube bends.

A laser pointer would be useful as the laser source, and solar array material is useful as the photosensitive array material. However, optimization of materials is within the scope of the invention. An optimum material to be selected will react well to the incident laser light and also give a sufficient output in ambient light conditions so that ambient lighting does not affect the response to the laser. Once the array material is selected, a circuit board that will condition the sensor array with a given number of wedges is constructed to light an LED when the laser is detected in or on a wedge. This setup can be used to optimize prototypes and work out any sensing issues.

However, with the present system, the precise shape of an inflatable can not only be monitored, but also controlled.

In a second embodiment, reflector 7 (and any additional reflectors of similar function (such as 8, 9 and 10)) is preferably a passive reflector constructed such that the reflected laser beam is always parallel to the incident beam, the reflector is preferably mounted directly to the inflatable structure, i.e., directly on fabric, the orientation, distance, and other parameters of which is to be monitored and controlled.

The reflected laser beam is received by a photoreceptor that is mounted in proximity to the laser in satellite 6.

In use, the laser scans the field of view continuously regardless of the position of the object. When the laser is oriented such that its beam is incident on the reflector 7, the photoreceptor will receive the reflected laser beam and issue positional time mark data to the computer.

The computer is in control of the source of the laser, and so will have the angle, positional and time information of the incident beam. By comparing this information to the time data from the photoreceptor, the computer can calculate, via geometric algorithms the distance, and X, Y and Z coordinates of the desired positioning of the structure. This data will be processed by a control algorithm to move the reflector 7 (and hence the fabric to which it is attached) toward a set of known coordinates, that is the final desired position of the object. It can accomplish this by sending a processed signal to each of a number of pressure control values (not shown) operably connected from a source of gas pressure (not shown) to each of the tubes 3, 4 and 5.

As an alternative, or in conjunction with the inflation system used to control the shape, a mechanical system can be employed to accomplish the same result as the inflation system.

Figure 3:
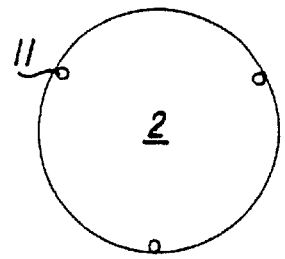
FIG. 3 is a schematic, top view of a second embodiment of an inflatable reflector according to the invention, sectioned to show details of the inflation system.

For example, one or more tensioned cables, one of which is shown as 11 (FIG. 3) can be employed. By using a motor, the length of the cable 9 can be adjusted so as to lengthen or shorten it. When attached to the fabric at the ends of the tube, it will exert a force assisting in changing the shape of the inflatable structure.

Having read the foregoing disclosure, those skilled in the art can readily construct equivalent systems for changing the shape of the inflatable structure, without departing from the scope of the invention.

We claim:

1. An inflatable structure comprising a gas confining fabric; said fabric defining a gas containing cavity when inflated; said structure being provided with means to adjust at least one parameter of the length, width, height or shape of the inflatable structure; in combination with a position feedback system to determine the position of at least one part on the structure, wherein said means to adjust comprise at least one cable independently adjustable in its length.

2. An inflatable structure comprising a gas confining fabric; said fabric defining a gas containing cavity when inflated; said structure being provided with means to adjust at least one parameter of the length, width, height or shape of the inflatable structure; in combination with a position feedback system to determine the position of at least one part on the structure, wherein said means to adjust comprise tensioned cables.

3. An inflatable structure comprising a gas confining fabric; said fabric defining a gas containing cavity when inflated; said structure being provided with means to adjust at least one parameter of the length, width, height or shape of the inflatable structure; in combination with a position feedback system to determine the position of at least one part on the structure, wherein the position feedback system comprises a reflector attached to said fabric, a light source for directing a light beam incident on said reflector, a photoreceptor to receive said reflected beam and a microprocessor operably connected to each of said light source and photoreceptor, said microprocessor being capable of sending a processed signal to said means to adjust so as to change the location of said reflector.

4. The inflatable structure of claim 3 wherein the light source is a laser.

5. A method of changing the shape of an enclosure inflated with a gas, said method comprising, positioning a reflector on the enclosure, creating a light beam incident on the reflector, creating and receiving a reflected light beam from said reflector and feeding process information concerning the angle, positional and time information of the incident beam to a microprocessor, calculating with the microprocessor at least one of the distance, and X, Y and Z coordinates of the reflector, comparing at least one of the distance and X, Y and Z coordinates with a desired position of the reflector, and causing modification of the shape of the enclosure so as to move the reflector toward said desired position.

6. The method of claim 5 wherein said modification of the shape is achieved by inflating at least one gas containing space separate from the inflated enclosure.

7. The method of claim 5 wherein said modification of the shape is achieved by adjusting the length of tensioned cables attached to said enclosure.

8. The method of claim 5 wherein said creating a reflected light beam comprises creating a reflected light beam parallel to the incident beam.

9. The method of claim 5 wherein said inflated enclosure is rigidified after said causing modification of the shape step.

10. An inflatable structure comprising a fabric envelope; said envelope being impervious to an inflation gas containable therein; adjusting elements; said adjusting elements being responsive to process signals received from a microprocessor, the adjusting elements being operatively connected to said fabric envelope to create tensile or compressive stresses in said envelope thereby changing the shape of the envelope, further comprising a laser beam light source.

11. The inflatable structure of claim 10 wherein the laser beam light source is a laser beam array.

12. The inflatable structure of claim 10 wherein the fabric envelope is provided with a plurality of reflectors attached to said envelope upon which laser beams from said laser beam light source are incident.

13. An inflatable structure comprising a fabric envelope; said envelope being impervious to an inflation gas containable therein; adjusting elements; said adjusting elements being responsive to process signals received from a microprocessor, the adjusting elements being operatively connected to said fabric envelope to create tensile or compressive stresses in said envelope thereby changing the shape of the envelope, wherein the adjusting elements comprise a plurality of independently inflatable tubes attached to said fabric envelope, and the adjusting elements further comprise tensioned cables.

14. A method of changing the shape of an enclosure inflated with a fluid, said method comprising positioning a light source sensing means in the enclosure, causing a light beam to impinge on the light source sensing means to create an output signal and processing such signal with a microprocessor to adjust or maintain the shape of the enclosures.

15. The method of claim 14, wherein said adjusting step is accomplished by varying a gas pressure in at least on inflatable tube connected to said enclosure.

16. The method of claim 14 wherein said adjusting step is accomplished by adjusting the length of a tension cable.

17. A method according to claim 14, whereby said adjusting comprises a step selected from the group consisting of inflating/deflating at least one tube in the inflatable structure and using a motor to modify the length of a cable connected to the inflatable structure.

18. A method according to claim 14, further comprising repeating said transmitting and said receiving after said adjusting.

* * * * *